United States Patent
Kalin et al.

(10) Patent No.: US 10,650,053 B2
(45) Date of Patent: *May 12, 2020

(54) SYSTEMS AND METHODS FOR GUIDED CONSTRUCTION OF A SEARCH QUERY IN AN ELECTRONIC COMMERCE ENVIRONMENT

(71) Applicant: ETSY, INC., Brooklyn, NY (US)

(72) Inventors: Robert Kalin, Brooklyn, NY (US); Gregory Fodor, Jr., Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 15/461,920

(22) Filed: Mar. 17, 2017

(65) Prior Publication Data

US 2017/0193130 A1    Jul. 6, 2017

Related U.S. Application Data

(63) Continuation of application No. 13/109,430, filed on May 17, 2011, now Pat. No. 9,633,109.

(51) Int. Cl.
*G06F 17/00* (2019.01)
*G06F 16/9032* (2019.01)
*G06F 16/951* (2019.01)
*G06F 16/957* (2019.01)
*G06F 16/332* (2019.01)
*G06Q 30/06* (2012.01)

(52) U.S. Cl.
CPC .... *G06F 16/90328* (2019.01); *G06F 16/3322* (2019.01); *G06F 16/90324* (2019.01); *G06F 16/951* (2019.01); *G06F 16/957* (2019.01); *G06Q 30/0623* (2013.01)

(58) Field of Classification Search
CPC .......... G06F 16/90328; G06F 16/3322; G06F 16/957; G06F 16/90324; G06F 16/951; G06Q 30/0623
See application file for complete search history.

(56) References Cited

U.S. PATENT DOCUMENTS

| | | |
|---|---|---|
| 6,516,312 B1 | 2/2003 | Kraft et al. |
| 6,704,729 B1 | 3/2004 | Klein et al. |
| 7,149,983 B1 | 12/2006 | Robertson et al. |
| 7,152,064 B2 | 12/2006 | Bourdoncle et al. |
| 7,293,231 B1 | 11/2007 | Gunn et al. |
| 7,523,099 B1 | 4/2009 | Egnor et al. |
| 7,672,932 B2 | 3/2010 | Hood et al. |

(Continued)

OTHER PUBLICATIONS

International Search Report and Written Opinion for International Application No. PCT/US12/38136 dated Jun. 8, 2012, 14 pages.

*Primary Examiner* — Tyler J Torgrimson
(74) *Attorney, Agent, or Firm* — Fish & Richardson P.C.

(57) ABSTRACT

A computer-implemented method includes receiving a search query from a user through a user interface of a user computing device, identifying a search term within the search query, the search term including at least a portion of the search query, generating, based at least in part on the search term, one or more alternative search terms that are each different from the search term, and sending, over the communication network, the one or more alternative search terms to the user computing device.

30 Claims, 7 Drawing Sheets

(56) References Cited

U.S. PATENT DOCUMENTS

| | | |
|---|---|---|
| 7,681,124 B2 | 3/2010 | Gunn et al. |
| 7,716,579 B2 | 5/2010 | Gunn et al. |
| 7,720,723 B2 | 5/2010 | Dicker et al. |
| 7,747,639 B2 | 6/2010 | Kasperski et al. |
| 7,788,261 B2 | 8/2010 | Hoeber et al. |
| 7,844,599 B2 | 11/2010 | Kasperski et al. |
| 7,958,143 B1 | 6/2011 | Amacker |
| 8,079,044 B1 | 12/2011 | Craner |
| 8,244,726 B1 | 8/2012 | Matesso et al. |
| 8,552,984 B2 | 10/2013 | Knaven |
| 2002/0080187 A1 | 6/2002 | Lawton |
| 2003/0037050 A1 | 2/2003 | Monteverde |
| 2005/0246249 A1 | 11/2005 | Bardwell |
| 2005/0278365 A1 | 12/2005 | Boucousis |
| 2007/0168357 A1 | 7/2007 | Mo |
| 2008/0086688 A1 | 4/2008 | Chandratillake et al. |
| 2008/0195601 A1 | 8/2008 | Ntoulas et al. |
| 2009/0132388 A1 | 5/2009 | Omori et al. |
| 2009/0144262 A1* | 6/2009 | White .................. G06F 16/242 |
| 2009/0234837 A1 | 9/2009 | Gladyshev |
| 2009/0254862 A1 | 10/2009 | Viginisson et al. |
| 2009/0282006 A1 | 11/2009 | Misvaer et al. |
| 2010/0131563 A1 | 5/2010 | Yin |
| 2010/0161661 A1 | 6/2010 | Hood et al. |
| 2010/0191619 A1 | 7/2010 | Dicker et al. |
| 2010/0280902 A1 | 11/2010 | Pang |
| 2011/0060734 A1 | 3/2011 | Hou et al. |
| 2011/0093488 A1* | 4/2011 | Amacker ........... G06Q 30/0643 707/767 |
| 2011/0106828 A1 | 5/2011 | Mauge |
| 2011/0106838 A1 | 5/2011 | Gutstadt et al. |
| 2011/0258173 A1 | 10/2011 | Ratiner et al. |
| 2011/0295720 A1 | 12/2011 | Parikh et al. |
| 2011/0307498 A1 | 12/2011 | McFarlane et al. |
| 2011/0314031 A1* | 12/2011 | Chittar .................. G06Q 30/00 707/749 |
| 2012/0047120 A1 | 2/2012 | Connolly et al. |
| 2012/0060181 A1 | 3/2012 | Craner |
| 2012/0084291 A1 | 4/2012 | Chung et al. |
| 2012/0221974 A1 | 8/2012 | Trotta et al. |
| 2015/0074120 A1 | 3/2015 | Ellsworth |

* cited by examiner

SYSTEMS AND METHODS FOR GUIDED CONSTRUCTION OF A SEARCH QUERY IN AN ELECTRONIC COMMERCE ENVIRONMENT

CROSS-REFERENCE TO RELATED APPLICATIONS

This application claims priority under 35 U.S.C. § 120 as a continuation of co-pending U.S. patent application Ser. No. 13/109,430, titled "SYSTEMS AND METHODS FOR GUIDED CONSTRUCTION OF A SEARCH QUERY IN AN ELECTRONIC COMMERCE ENVIRONMENT," filed on May 17, 2011, which is herein incorporated by reference in its entirety for all purposed.

BACKGROUND OF THE INVENTION

1. Field of Invention

Embodiments of the present invention relate generally to electronic commerce.

2. Discussion of Related Art

A search engine is a computer program that facilitates locating electronically stored information, for example, in a database. Search engines are commonly used in distributed computer systems, such as those connected to the Internet, for providing information to users. In one example implementation, a user can provide input to the search engine in the form of a search query, which may include one or more words that are relevant to the information sought. The search engine searches for information that satisfies the search query and returns the information to the user as a set of search results.

BRIEF SUMMARY OF THE INVENTION

According to one embodiment of the present invention, it is appreciated that a common problem for users who use a conventional search engine includes deciding how to improve or change the search query to yield desirable results. For example, it can be difficult for a user to find desired information using a conventional search engine unless the user has prior or independent knowledge of which search terms are likely to provide the best results. Therefore, it is desirable to provide the user with guidance in constructing the search query. Such guidance may include, for example, suggesting one or more additional and/or alternative search terms to the user based on a user-supplied search query. The user may optionally select and use the additional and/or alternative search terms to construct a different search query that will yield desirable results.

Systems and methods of providing guided construction of a search query in accordance with various embodiments of the invention are described herein. One particular embodiment includes a method for identifying one or more component search terms within a user-supplied search query, and generating one or more additional and/or alternative search terms based, at least in part, on the component search terms of the user-supplied search query. According to one embodiment, additional and/or alternative search terms may be generated and suggested to the user based on relevancy criteria applied to the information to be searched, such as descriptions, colors, materials, textures, uses, and other characteristics. In this manner, the additional and/or alternative search terms can be used by the user to construct a search query that yields desirable results.

In one example, a user interface is provided and configured to present one or more alternative search terms to the user for review within the user interface. The alternative search terms may be generated in response to a user-supplied search query. The user interface may be further configured to enable the user to modify the search query by electively removing one or more of the search terms from the search query, electively adding search terms to the search query from a list of additional search terms that are generated based, at least in part, on the search query, and/or electively substituting the search terms in the search query with alternative search terms that are generated based, at least in part, on the search query. The user may, for example, construct the search query using the additional and/or alternative search terms by selecting one or more of the search terms with an input device, such as a mouse, in a single action (e.g., by simply clicking on one of the search terms). The selected term or terms are automatically added to the search query, or substituted for a search term that is already in the search query.

The modified search query may be submitted to a search engine for processing (e.g., to generate a new set of search results based on the modified search query, and/or to refine an existing set of search results based on the modified search query). Accordingly, the search results and/or the overall search process can be improved by enabling the user to choose from one or more suggested search terms that will assist the user in achieving desirable search results. In another example, the user may modify the search query by removing one or more search terms (e.g., by simply clicking on a search term, or icon associated with the search term, within the user interface). The modified search query may be submitted to the search engine for processing, such as described above.

According to one embodiment of the present invention, a computer-implemented method includes receiving, over a communications network, a search query from a user through a user interface of a user computing device, identifying a search term within the search query, the search term including at least a portion of the search query, generating, based at least in part on the search term, one or more alternative search terms that are each different from the search term, and sending, over the communication network, the one or more alternative search terms to the user computing device.

In another embodiment, the computer-implemented method may include modifying the search query by substituting the search term with at least one of the alternative search terms in response to a single action to be taken by the user within the user interface. The modified search query may include the alternative search terms. The single action may include accepting an input from the user that selects the at least one of the alternative search terms.

In yet another embodiment, the computer-implemented method may include generating a set of search results by searching, based on the modified search query, for information contained in one or more databases.

In yet another embodiment, the computer-implemented method may include modifying the search query by removing the search term from the search query in response to a single action to be taken by the user within the user interface. The single action may include accepting an input from the user that selects the search term to be removed.

In yet another embodiment, the computer-implemented method may include generating a set of search results by searching, based on the modified search query, for information contained in one or more databases.

In yet another embodiment, the computer-implemented method may include modifying the search query by adding at least one of one or more the alternative search terms to the search query in response to a single action to be taken by the user within the user interface. The single action may include accepting an input from the user that selects the at least one of the one or more alternative search terms.

In yet another embodiment, the computer-implemented method may include generating a new set of search results by searching for information contained in one or more databases based on the modified search query.

In yet another embodiment, the computer-implemented method may include generating one or more search category selectors based, at least in part, on the search term. Each of the one or more search category selectors may be categorically representative, at least in part, of one or more properties of a merchandise item. In yet another embodiment, the computer-implemented method may include generating a user interface having the one or more search category selectors. The user interface may be configured to display at least one of the one or more alternative search terms in response to an action to be taken by the user within the user interface upon a respective one of the one or more search category selectors, and the user interface may be sent to the user computing device over the communications network.

In yet another embodiment, at least one of the generated one or more alternative search terms may represent a property of a merchandise item. In yet another embodiment, the property may include a description of the merchandise item, a theme associated with the merchandise item, a style of the merchandise item, a color of the merchandise item, a use for the merchandise item, a psychological appeal of the merchandise item, a specification for the merchandise item, a type of intended recipient for the merchandise item, an occasion associated with the merchandise item, a material that the merchandise item is constructed of, a tactile sensation of the merchandise item, and/or a construction technique associated with the merchandise item.

In yet another embodiment, the computer-implemented method may include generating a user interface having the one or more alternative search terms displayed within a window, the one or more alternative search terms being selectable by a user using an input device operatively coupled to the user interface. In yet another embodiment, the computer-implemented method includes modifying the search query by adding a user-selected one of the displayed alternative search terms to the search query in response to the user selecting the user-selected alternative search term through the user interface. In yet another embodiment, the computer-implemented method may include generating a set of search results, based on the modified search query, by searching for information contained in one or more databases.

In yet another embodiment, the computer-implemented method may include modifying the search query by substituting the identified search term with a user-selected one of the displayed alternative search terms in response to the user selecting the user-selected alternative search term through the user interface. The modified search query may include the user-selected alternative search term. In yet another embodiment, the computer-implemented method may include generating a set of search results, based on the modified search query, by searching for information contained in one or more databases.

According to one embodiment of the present invention, a computer-implemented method includes sending a search query to a search engine, receiving one or more alternative search terms from the search engine, and displaying, within a user interface, the search query and the one or more alternative search terms. The one or more alternative search terms are based, at least in part, on at least a portion of the search query. The sending and receiving may occur through a communication network. At least one of the generated one or more alternative search terms may represent a property of a merchandise item.

In another embodiment, the computer-implemented method may include identifying, to a user and within the user interface, a search term within the search query. In yet another embodiment, the computer-implemented method may include enabling the user to select one of the one or more alternative search terms displayed within the user interface using a user input device, and modifying the search query by substituting the search term with the selected alternative search term in response to a single action to be taken by the user within the user interface, such that the search query includes the selected alternative search term. The single action may include accepting an input from the user that selects the alternative search term to be substituted.

In yet another embodiment, the computer-implemented method may include enabling the user to select one of the one or more alternative search terms displayed within the user interface using a user input device, and adding the selected alternative search term to the search query in response to a single action to be taken by the user within the user interface, such that the search query includes the selected alternative search term. The single action may include accepting an input from the user that selects the alternative search term to be added.

In yet another embodiment, the computer-implemented method may include enabling a user to delete the search term from the search query in response to a single action to be taken by the user within the user interface. The single action may include accepting an input from the user that selects the search term to be deleted.

In yet another embodiment, the computer-implemented method may include generating one or more search category selectors based, at least in part, on the search term, wherein each of the one or more search category selectors is categorically representative, at least in part, of one or more properties of the merchandise item. In yet another embodiment, the computer-implemented method may include configuring the user interface to display at least one of the alternative search terms in response to an action to be taken by the user within the user interface upon a respective one of the search category selectors.

According to one embodiment of the present invention, a computer-implemented method includes sending a search query to a computer server system over a communications network, receiving, from the computer server system over the communications network, one or more alternative search terms, wherein at least one of the one or more alternative search terms represents a property of a merchandise item, displaying, on a user interface, a list including the one or more alternative search terms, identifying a search term within the search query, enabling a user, through the user interface, to select the search term, receiving, from the user through the user interface, a selected search term in response to an action to be taken by the user upon the search term within the user interface, enabling the user, in response to receiving the selected search term, to select one or more of the alternative search terms from the displayed list through the user interface, and, receiving, from the user through the user interface, a selected alternative search term in response to an action to be taken by the user upon the search term within the user interface.

In another embodiment, the computer-implemented method may include modifying the search query by substituting the selected search term with the selected alternative search term. In yet another embodiment, the computer-implemented method may include modifying the search query by adding the selected alternative search term to the search query.

According to one embodiment of the present invention, a computer system includes a memory, a processor coupled to the memory and configured to execute one or more non-transient programs stored in the memory, and a network interface coupled to the processor and a communication network. The network interface may be configured to send and receive data through the communication network. The one or more programs include instructions executable by the processor, and when executed are configured to receive, over the communications network, a search query from a user through a user interface of a user computing device, identify a search term within the search query, the search term including at least a portion of the search query, generate, based at least in part on the search term, one or more alternative search terms that are each different from the search term, and send, over the communication network, the one or more alternative search terms to the user computing device.

According to one embodiment of the present invention, a non-transitory computer readable medium has computer-executable instructions stored thereon. The computer-executable instructions, when executed by a computer, cause the computer to perform a method including receiving, over a communications network, a search query from a user through a user interface of a user computing device, identifying a search term within the search query, the search term including at least a portion of the search query, generating, based at least in part on the search term, one or more alternative search terms that are each different from the search term, and sending, over the communication network, the one or more alternative search terms to the user computing device.

BRIEF DESCRIPTION OF THE DRAWINGS

The accompanying drawings are not intended to be drawn to scale. In the various drawings, each identical or nearly identical component that is illustrated in various figures is represented by a like numeral. For purposes of clarity, not every component may be labeled in every drawing. In the drawings:

FIGS. 1A-1E illustrate a graphical user interface for providing guided construction of a search query, in accordance with an embodiment of the present invention;

DETAILED DESCRIPTION OF THE INVENTION

Figure 1A:
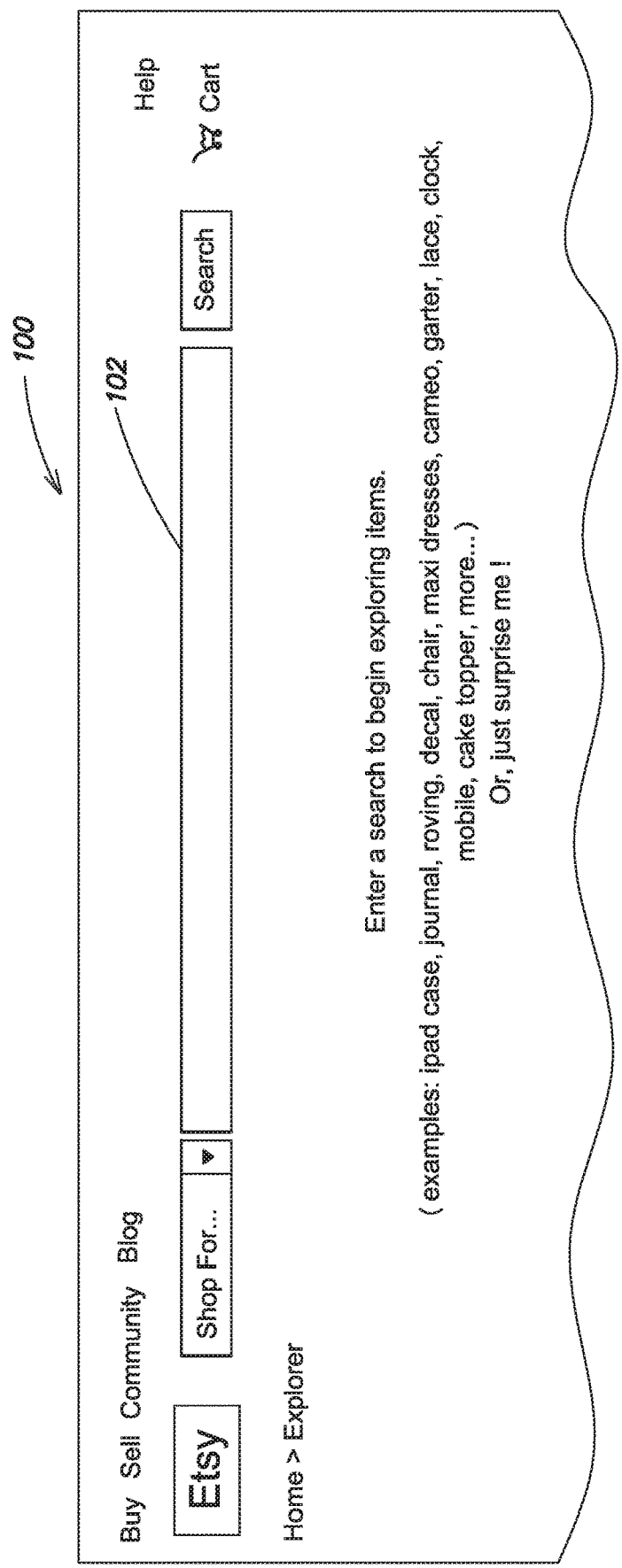

Embodiments of the invention are not limited in their application to the details of construction and the arrangement of components set forth in the following description or illustrated in the drawings. Embodiments of the invention are capable of other embodiments and of being practiced or carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Overview

A search engine, according to one embodiment of the invention, includes improved algorithms for locating certain information, such as information stored in one or more databases, with one or more computers. The searching is based, at least in part, on a user-supplied search query. The search engine may utilize techniques in which the search results are dependent on the terms within the search query. For example, the search engine may process search queries that are unstructured in that the terms appear in no specific order and are not subject to any syntax rules.

One example of such an unstructured search query is a search query of "green shirt," which may be treated in substantially the same manner as a search query for "shirt green." In other words, the results of the search may be substantially the same regardless of the order of the search terms "green" and "shirt" within the search query. Further, the terms themselves may be ambiguous. For example, "shirt" or "shirts" may be interpreted to broadly include any type of garment that is worn on the upper body, and either term is not limited to the singular or plural. Similarly, "green" may be interpreted, for example, to include items that are green in color and "green" as a synonym for something that is environmentally friendly. The results of a search, therefore, may be dependent on the specificity, or lack thereof, of the terms provided by the user in the search query. The search results may optionally be revised by the user adding, removing, or modifying one or more terms of the search query, for example, to narrow the results to a subset of the original results, to generate new results, or some combination thereof.

According to one embodiment, it is appreciated that while some conventional search algorithms can produce results for broad and unstructured queries, which is a desirable feature, the flexibility such an approach affords also tends toward a one-size-fits-all solution that is not adequately customized for the search preferences of an individual user. This can make the process of discovering relevant information more difficult for the user. For instance, if the user is dissatisfied with the results produced by an initial search query, the user must contemplate alternative approaches to generating the query, typically in a trial-and-error fashion. For example, a user who is searching for red shirts may be inundated with results containing information about any and all kinds of shirts that are red in color, or theme, or style, to name just a few possibilities. Such a broad spectrum of information is unlikely to provide satisfactory results for the user. Therefore, the user is faced with the prospect of deciding how to modify the query in a way that is likely to produce more relevant results, usually by devising alternative search queries. According to at least one embodiment of the present invention, new techniques are used to improve the quality of the results by assisting or guiding the user in constructing a search query that is likely to produce more highly relevant results.

According to one embodiment of the present invention, a search engine uses one or more different search algorithms to perform searches for information that is relevant to a user query. Further, the search algorithm may optionally be configured to calculate the relevancy of any information matching some criteria for satisfying the query, and limit the search results to include only information having a high relevancy to the query. This reduces the difficulties caused when the most relevant results are obscured from the user by virtue of information overload. The algorithms may be tailored to locate information that is most relevant to the context in which the user requesting the information is operating. For example, if the user is searching within an e-commerce environment, the search algorithm may be configured to search for information within the context of one or more categories of information that are relevant to merchandise sold within the environment, such as item description, color, style, material, price, usage, construction technique, intended use and/or user, and so forth.

According to at least one embodiment of the present invention, it is appreciated that many users begin searching for information, particularly within an e-commerce environment, by entering a simple and broad search query into their web browser. For example, an initial search query may include "antique gold cuff links." Given the ambiguity of the initial query and the large amount of relevant information available (e.g., within a catalog or listing of items for sale), the results of such a search are likely too coarse or overbroad to be of much use to the user. For example, the search results may contain hundreds or thousands of information matches, or "hits." Such a large number of hits may be one indication that the results are not refined enough to be of significant value to the user. At this point, the user is subjected to information overload and is unlikely to spend much time additional inspecting such a coarse result set. Rather, the user will prefer to revise the search in an iterative manner until either the user is satisfied with the results or decides to abandon the search.

Typically, one difficulty facing the user is a lack of knowledge about the content of the information that is available. For example, a user searching for hats may not be familiar with the variety of styles, colors, materials, descriptions, purposes, uses, construction techniques, and so forth that exist, making the search process more difficult to refine without assistance. Thus, according to one embodiment of the present invention, techniques are described herein for providing assistance to a user who is searching for information, such as items for sale within an e-commerce website.

In one embodiment, initially a search query is received from a user computing device. This may occur after a user has entered the search query into, for example, a web browser and submitted the query for searching. The search query is parsed to identify one or more terms within the query. The terms may be individual words or groups of words that are related, for example, for search purposes, such as by category (e.g., style, color, material, description, and so forth). In one example, if the search query is "elegant gold cuff links," the query may be parsed into the terms "elegant" (a style and/or theme term), "gold" (a color and/or material term), and "cuff links" (a description term). In this manner, the search query is broken down into constituent parts for convenience and to aid in constructing a modified search query having more, fewer, or different terms than the prior or original search query.

For one or more of the identified search terms, one or more alternative search terms are generated. For example, alternative terms for "elegant" (e.g., a style and/or theme) may include "formal" or "shiny"; alternative terms for "gold" (e.g., a color and/or material) may include "silver" or "brass"; and alternative terms for "cuff links" (e.g., a description, purpose and/or use) may include "brooch" or "charm." The user may optionally delete the identified search term from the search query, add one of the alternative terms to the query, and/or substitute the identified search term with one of the alternative terms. In response to any of these actions, new or revised search results may be presented to the user (e.g., within a window of a browser operating on the user computing device).

In another embodiment, the user may perform any of the above actions with a single action, such as by using a mouse or other input device to select the action by clicking on a portion of a user interface that is configured accordingly. Accordingly, this technique enables the user to iteratively revise a search query quickly, categorically and efficiently without having to use a keyboard and without having to know relevant search terms beforehand. Further, unlike some conventional predictive search techniques, some embodiments of the present invention enable a user to selectively choose from a plurality of alternative search terms that have categorical relevance to the subject matter of the information sought.

These and other embodiments are described below with respect to the drawings.

Guided Construction of a Search Query Examples

FIGS. 1A-1E illustrate a graphical user interface (GUI) 100 for providing guided construction of a search query according to one embodiment of the present invention. GUI 100 is generated at least in part using data provided by a computer system, such as a system that provides an e-commerce website, and may be displayed by a browser program operating on a user computing device, such as a personal computer connected to the computer system over a network (e.g., the Internet, an intranet, or other communications network that supports data transmission between the computer system and the user computing device). Various exemplary techniques for providing the guided construction of the search query are described with respect to GUI 100 as shown in FIGS. 1A-1E. The manner in which these techniques are described herein should not be interpreted as prescribing a particular order or sequence in which embodiments of the present invention must be carried out. For example, certain functions shown in the various drawings may occur separately and independently of others, such as would be caused in response to various interactions with GUI 100 by a user. Thus, various embodiments of the present invention do not constrain the user in the manner of using GUI 100 to what is specifically described below, and various embodiments of the present invention may operate in other ways or combinations not explicitly set forth in this description.

FIG. 1A shows GUI 100 configured to display an entry point for enabling the user to begin a guided search, according to one embodiment. GUI 100 includes a search query entry field 102 into which the user may enter text representing the terms of a search query. As shown in FIG. 1A, search query entry field 102 may be initially empty, allowing the user to enter a new search query. The text that the user enters into search query entry field 102 may subsequently be used by the computer system (e.g., a web server or other computer system that supports operation of the e-commerce website) to generate a set of search results based, at least in part, on the search query using one or more search algorithms. For example, the search may be initiated in response to the user clicking on a search button within GUI 100 or pressing an Enter key on a keyboard of the user computing device. After receiving the search query, the search algorithm or algorithms apply the search query against information stored in one or more databases to locate relevant information therein, and the computer system delivers the relevant information to GUI 100 so that the user may view the information. In at least one embodiment, known search algorithms are used to locate the relevant information.

Figure 1B:
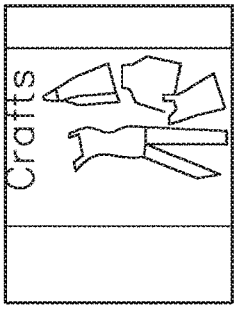

FIG. 1B shows GUI 100 subsequent to processing the search query entered into search query entry field 102. In the illustrated example, the search query that the user entered into search query entry field 102 is "garden seasonal." A set of search results 104 may be displayed within GUI 100. The search results may, for example, include merchandise items that are relevant to the search query as applied to one or more search algorithms GUI 100 includes one or more add term selectors 106, which may be utilized by the user to modify the search query, as will be discussed in further detail below.

The search query can be broken down into one or more component search terms. Each search term includes one or more words of the search query. In this example, where the search query is "garden seasonal," the search terms are "garden" and "seasonal." It should be understood that a search term may include one or more words of the search query that are grouped together. For example, each of the phrases "New York," "bird house," or "street lamp" may be considered a single component search term due to the relation of the words within the search term. Although "bird" and "house" may also be component search terms, the results of searching "bird" or "house" may not produce the same results as "bird house" (or "birdhouse"), the latter of which is more likely what the user desires to search for. If the search query includes only one word, then the search term may be the same as the search query. Each of the search terms may be selected by the user within GUI 100, for example, by clicking on or hovering over the term with a mouse or other input device connected to the user computing device.

Figure 1C:
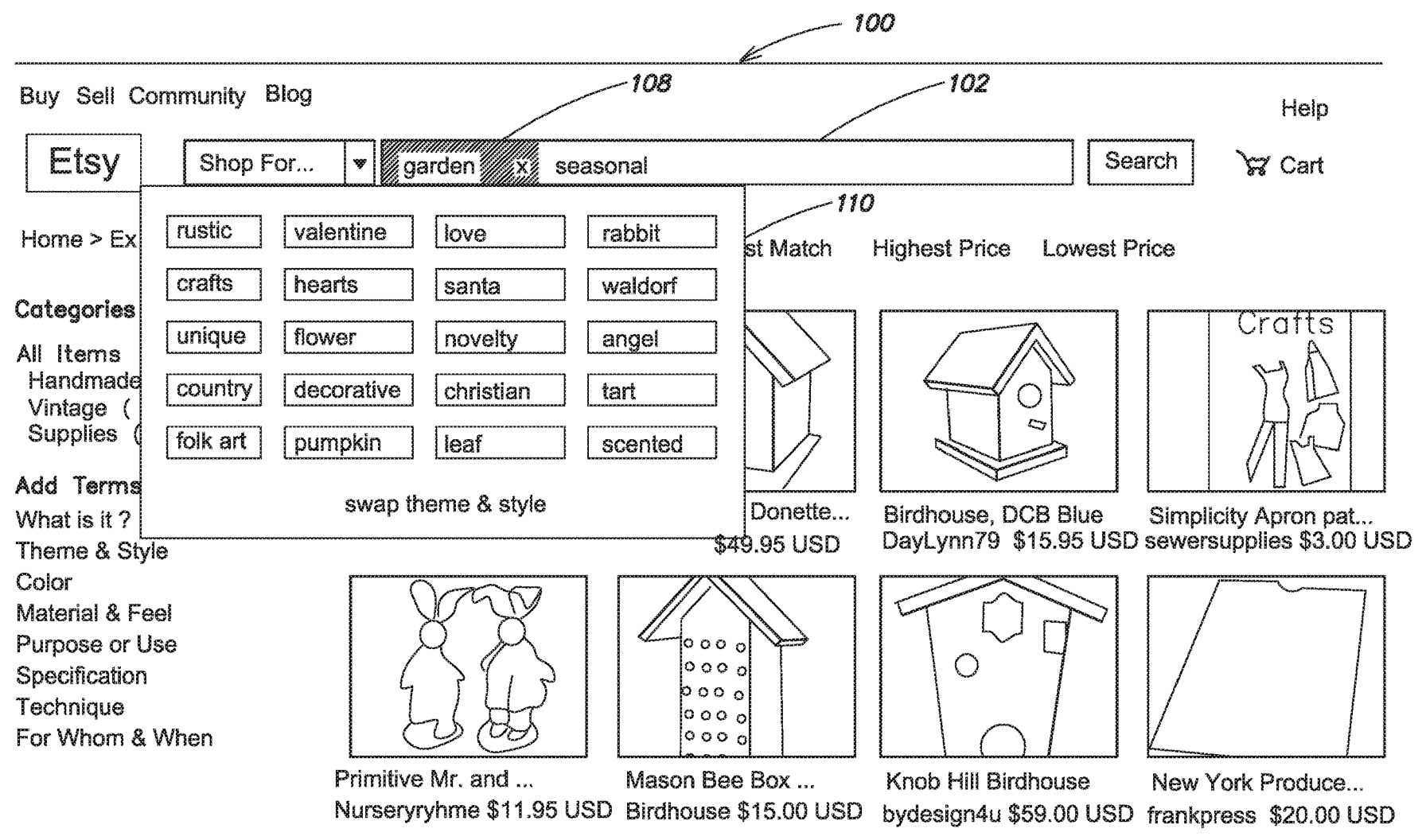

FIG. 1C shows GUI 100 when the user selects one of the search terms; in this example, the term "garden" is selected. The selected search term 108 is highlighted, and an alternative search term display 110 is presented to the user. Alternative search term display 110 includes one or more alternative search terms that are each related to selected search term 108. The alternative search terms may be generated automatically by the computer system in response to receiving and/or processing the search query. For example, the alternative search terms may be based, at least in part, on terms related to selected search term 108, such as by description, color, material, use, or other relevant characteristic.

In one embodiment, the alternative search terms are drawn from a database of item listings (e.g., item description keywords) and/or from an electronic dictionary and/or thesaurus. Any one or more of the alternative search terms displayed in alternative search term display 110 may be selected by the user, for example, using the mouse to click on one of the alternative search terms, and the selected alternative search term is automatically added to the search query. For example, the user may select "rustic" as an alternative search term, which modifies the search query to "rustic seasonal." Subsequent to adding one or more of the alternative search terms to the search query, a new search may be performed using the modified search query. In this manner, the computer system guides the user in constructing the search query by enabling the user to select alternative search terms from alternative search term display 110 for revising the set of search results 104. In particular, according to one embodiment, the alternative search terms may be added to the search query by a single user action, for example, by simply clicking on the desired alternative search term. As used herein, the single user action or single action may include, for example, depressing a button on an input device such as a mouse, or a similar action performed or taken by a user within the user interface (e.g., GUI 100). An indication of the performance of the single action may be sent from the user interface, executing on a user computing device, to the computer system (e.g., the web server) subsequent to the performance of the single action, such as by sending a message.

In another embodiment, selected search term 108 may be removed or deleted from the search query by the user, for example, by clicking on an "X" icon (shown but not labeled) displayed next to selected search term 108, or by use of another mechanism (e.g., pressing the backspace or delete key). In this example, the user may delete the selected search term "garden" by clicking the "X" next to the term. Subsequently, the search query is modified to "seasonal." Optionally, a new search may be performed automatically using the modified search query.

Figure 1D:
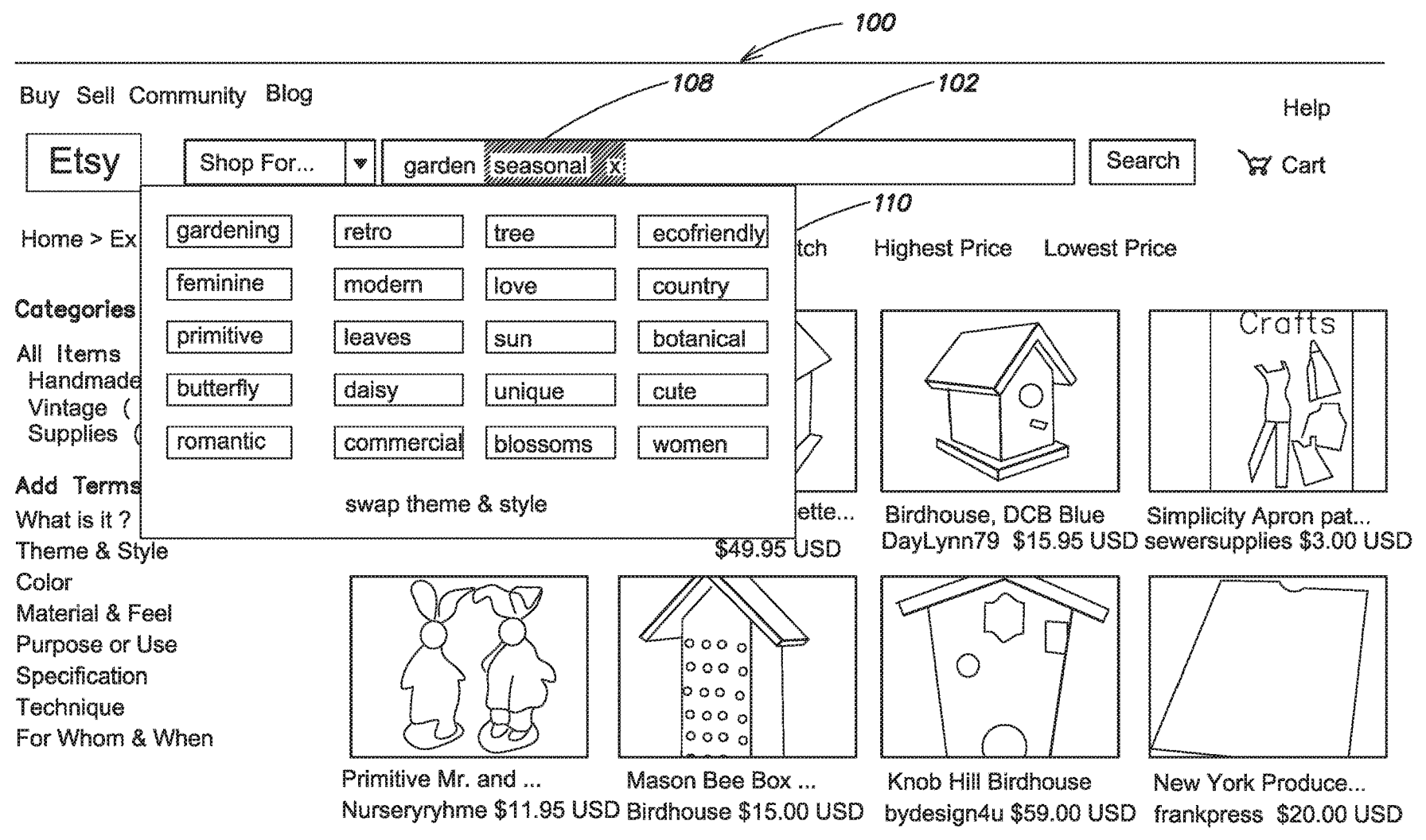

FIG. 1D shows GUI 100 in a configuration similar to that shown in FIG. 1C, except in FIG. 1D the user has selected the search term "seasonal," and alternative search term display 100 includes a different set of alternative search terms that are related to the search term "seasonal." For example, within the context of garden items (as included in the search query), the search term "seasonal" could be considered a modifier term, as in seasonal garden items. Thus, the alternative search terms for "seasonal" may specifically include other modifier terms related to "garden," such as "commercial" or "ecofriendly." However, it should be appreciated that the alternative search terms are not so limited. For example, the selected search term may be categorized according to a relevant characteristic, such as description, style, theme, color, material, purpose, use, specification, construction technique, and/or intended user or recipient. Any of these categories may be used to generate alternative search terms that are relevant to the corresponding category. Additional examples of categorized search terms are described below.

Figure 1E:
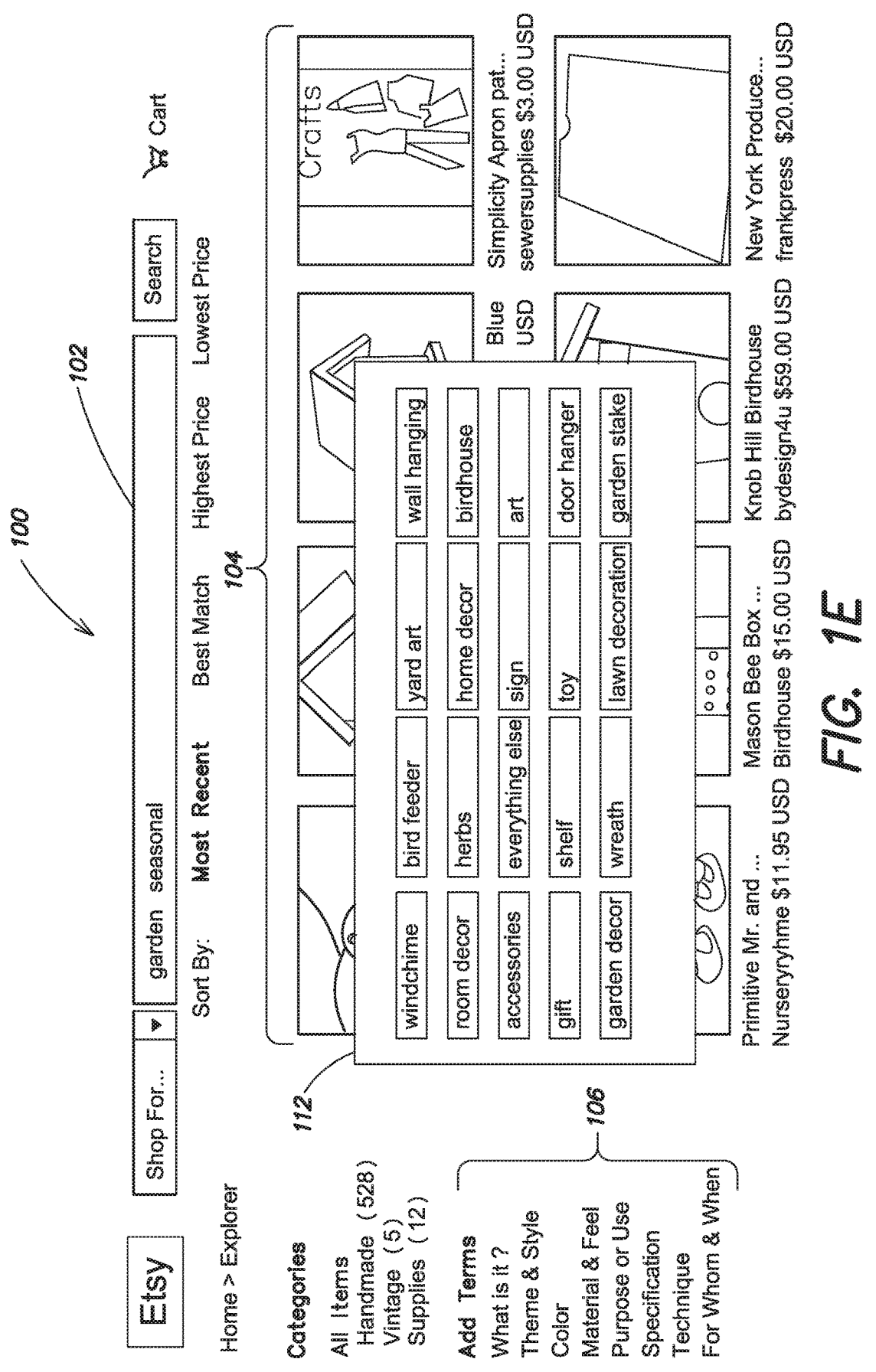

FIG. 1E shows GUI 100 including add term selectors 106, according to one embodiment. Add term selectors 106 are displayed in GUI 100 as, in one example, a list of categories of search terms that may optionally be used by the user to add additional search terms to the search query. The categories may have generic, descriptive or fanciful names such as "What is it?" (e.g., a category including a portion of an item description), "Theme & Style," "Color," "Material & Feel," "Purpose or Use," "Specification," "Technique," "For Whom & When," and/or other names representing various categories of search terms. Each category may represent a property associated with a merchandise item (e.g., an item included in a set of search results generated from the search query). For example, one property of the merchandise item may be color, such as blue, green, or red, and therefore one of the categories of search terms may be "color." In another example, one property of the merchandise item may be psychological appeal, for instance, a blanket may represent comfort and/or warmth, in which case the relevant category may be "comfort," "cozy," or "winter," just to name a few examples. Other categories representing properties other than those described herein may be used. Each of add term selectors 106 is selectable by the user, using an input device such as a mouse, although one or more of the add term selectors may be disabled or configured to disallow such user selection.

The use and operation of add term selectors 106 are now described through an example. As shown in FIG. 1E, an exemplary search query of "garden seasonal" has been entered into search query entry field 102, and a search performed by the computer system in response to receiving the search query, with a portion of one set of search results 104 displayed within GUI 100. Depending at least in part on the search query, one or more of add term selectors 106 are displayed and activated to enable the user to select a respective one of the selectors (e.g., using an input device such as a mouse). As described above, each add term selector 106 represents a different category of additional search terms 112 within which one or more additional search terms 112 are contained. For example, one category may be called "What is it?" and include search terms that are descriptive of items relevant to the search query, such as "art," "toy," "decoration," "outdoor," and so forth. In another example, one category may be called "Color" and include search terms that are descriptive of the color or appearance of items relevant to the search query, such as "blue," "green," "pink," "aqua," "plaid," and so forth. The categories may be fixed, in that they are the same or substantially similar regardless of the search query, or the categories may be variable, in that they are generated by the computer system in response to submission of the search query and thus may be different for different search queries.

In one embodiment, additional search terms 112 are automatically generated by the computer system in response to processing the search query in a manner similar to that described above with respect to alternative search terms 110 in FIG. 1C, and may optionally be grouped according to one or more of the categories represented by add term selectors 106. As described below, one or more of additional search terms 112 may be optionally selected by the user, which causes the selected term to be automatically added to the search query (thus modifying the search query). Because of the variable nature of the search query and the results that are subsequently produced by performing the search query, one or more add term selectors 106 may not be active after the search query is performed. For example, only those selectors for which one or more relevant alternative search terms are generated may be active. Described in another way, if additional search terms are generated for "What is it?" and "Color," only the add term selectors 106 corresponding to "What is it?" and "Color" are active, and any other selectors are inactive. If the search query is modified, alternative search terms 112 may also change, which may cause different add term selectors 106 to become active or inactive dynamically or in response to modifications of the search query.

According to one embodiment, it should be appreciated that by categorizing additional search terms 112, the user is aided in constructing the search query. For instance, if the user is interested in searching for items based on description, color, material, or other relevant characteristic or quality, the additional search terms 112 are conveniently organized in a way that is useful and beneficial to the user, particularly for a user who is seeking suggestions that will assist in fully forming a search query that may produce desirable results. It should be further appreciated that, according to one embodiment, the categories used to organize the additional search terms 112 may be different than those described herein, or variable such that they are adapted to the context established by the search query and other factors, such as purchase history/activity (either of the user or of other users), items currently listed for sale on the e-commerce website, sales promotions, advertising/marketing campaigns, and so forth.

When the user selects one of the add term selectors 106, GUI 100 displays one or more additional search terms 112 associated with the selected add term selector. Similar to alternative search terms 110 described above with respect to FIGS. 1C and 1D, one or more additional search terms 112 may selected by the user (e.g., using an input device connected to the user computing device, such as a mouse). The selected additional search term 112 is added to the search query, thus modifying the search query to include the newly added term in addition to any of the terms that were previously in the search query. In this manner, the search query, or a new search query, is constructed using one or more of the terms that are suggested by the computer system. The computer system receives the modified search query automatically and/or when the user submits the modified search query from GUI 100. The computer system may optionally perform a new search using the modified search query, and return the results of the new search to GUI 100. Any of the search terms within the search query may be modified and/or deleted by the user. For example, the user may use an input device such as a keyboard and/or mouse to modify the search query. Alternatively, any of the search terms within the search query may be modified semi-automatically using the techniques described above with respect to FIGS. 1C and 1D.

Figure 2:
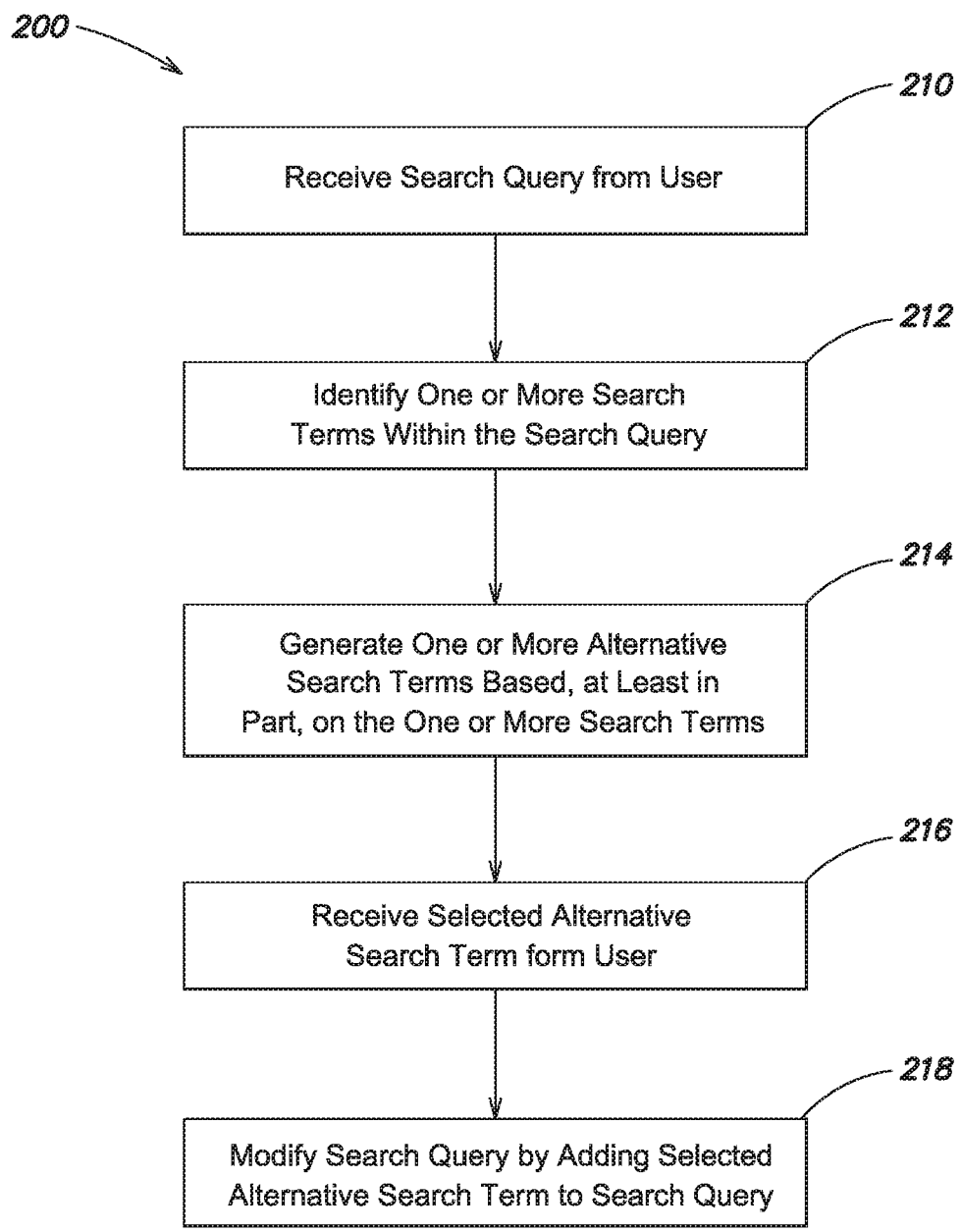
FIG. 2 is a flow diagram of a process for guided construction of a search query, in accordance with another embodiment of the present invention.

FIG. 2 is a flow diagram illustrating a process 200 according to one embodiment of the present invention. Process 200 may be performed, for example, by a computer system such as a web server, a backend system supporting an e-commerce environment, or other computing system that receives data from a user, including a search query. At block 210, the search query is received from the user. The search query may be entered into a web page within a web browser, or other user interface, executing on a user computing system, which is subsequently transmitted over a network to the computer system for processing. The processing may include applying the search query to one or more search algorithms, which produces a set of search results (e.g., a listing of information matching the terms of the search query). The set of search results may be transmitted from the computer system to the user computing system and displayed within the web browser for the user to view.

At block 212, one or more search terms within the search query are identified. As discussed above, search terms include one or more words within the search query. If the search query only contains one word, then there is at most one search term within the search query. However, if the search query includes more than one word, they may be one or more search terms within the search query. For example, a search query that includes "New York cuff links" may include search terms "New York" and "cuff links." One reason for combining "New" and "York" into a single search term "New York" is that New York is a commonly known place name, and the two words would reasonably and logically be associated with one another in a search query. Similarly, one reason for combining "cuff" and "links" into a single search term "cuff links" or "cufflinks" is that cuff links, when used in the same context (e.g., within the search query), would reasonably and logically be associated with one another. Such associations may, for example, be predefined in a database of common search terms, or identified through a search of a listing database for merchandise items having one or more of the words in the search term (e.g., such a search might return items described as "cuff links" more frequently than items described as "cuff" only.)

The identified search terms may be used for several purposes. In one embodiment, the words of each search term within the user interface are highlighted so that the user can select the respective search term from within the entire search query. Once selected, the user may choose to delete the term from the query (e.g., by clicking on a delete icon), or, alternatively, the user may choose to substitute the selected term with an alternative search term that is suggested by the computer system, such as described below.

In another embodiment, one or more alternative search terms are generated based, at least in part, on the identified search term (block 214). The alternative search terms may include terms that are related or relevant to the identified search term. For example, if the identified search term is "green," the identified search term may be categorized as a color. Accordingly, alternative search terms for "green" may include other colors, such as "blue," "red," "black," "aqua," "chartreuse," and so forth. Alternatively, the term "green" may be categorized as a material (e.g., as in an environmentally friendly material). Accordingly, alternative search terms for "green" may include "recycled," "natural," "earth," "biodegradable," "environmentally-safe," and so forth. The alternative search terms may be, for example, synonyms and/or antonyms of the identified search terms, or may be chosen from a list of keywords in a database (e.g., keywords within a description of a merchandise item), or from another source.

At block 216, a selected alternative search term is received from the user. This may occur subsequent to the user selecting (e.g., using an input device such as a mouse) one of the alternative search terms that is displayed in the user interface. At block 218, the search query is modified by substituting the identified search term with the selected alternative search term. For example, the identified search term is removed from the search query and replaced with the selected alternative search term. The modified search query thus includes the selected alternative search term. In another embodiment, the search query is modified by adding the identified search term to the search query. The modified search query may be displayed in the user interface, and the user may further modify the search query. Alternatively, a new search may be performed using the modified search query, and the results of the new search displayed in the user interface.

System Overview

Figure 3:
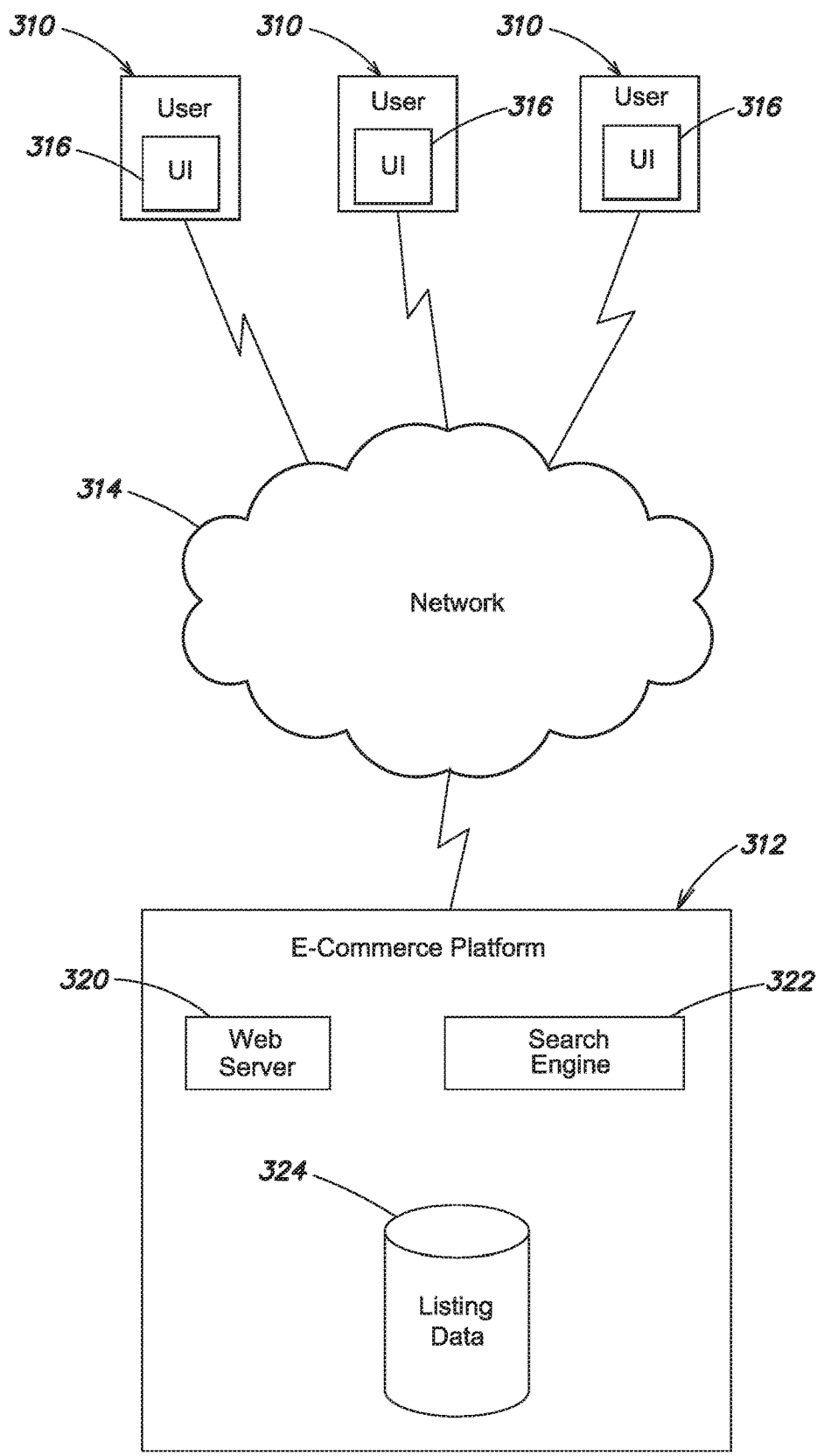
FIG. 3 is a block diagram showing a system for guided construction of a search query, in accordance with yet another embodiment of the present invention.

FIG. 3 illustrates a block diagram of an electronic commerce system according to one embodiment of the present invention. One or more users 310, each using a user computing system, connect with an e-commerce platform 312 through a network 314, such as the Internet or other communication network. The user computing system is configured to run a web browser program or user interface 316 that enables user 310 to access and interact with e-commerce platform 312 (which may include interacting with, for example, an e-commerce website). E-commerce platform 312 includes a web server 320, a search engine 322, and at least one database 324. Web server 320 includes software that enables e-commerce platform 312 to generate web pages and otherwise communicate and exchange information with each user 310 and user interface 316 over network 314. Search engine 322 includes software that, in response to receiving search queries from user 310, searches the contents of database 324 using one or more search algorithms Database 324 includes, among other things, listing data associated with each item listed with the e-commerce other information associated with the merchandise items, such as item descriptions, colors, materials, construction techniques, purposes, uses, specifications, intended uses and/or users. For example, the listing data may include a name or title for each item that is listed for sale, a description of the item, information about the seller of the item, a photograph of the item (or other visual representation), information about purchasing the item, keywords associated with the item, and other information related to the item.

Each user 310, who may be, for example, a buyer, a seller, or an intermediary, uses a client computing system (not shown) to interact with e-commerce platform 312. Any user 310, regardless of how they are classified, can perform searches within e-commerce platform 312. Although a buyer (or potential buyer) usually initiates a search, buyers, sellers, search facilitators, and other intermediaries may all work in collaboration with one another while searching for an item.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method of constructing a search query in an electronic commerce environment, the method comprising:

receiving, over a communications network, a search query from a user through a user interface of a user computing device;

identifying a plurality of search terms within the search query, each of the plurality of search terms including at least a portion of the search query;

executing the search query to generate search results including a list of items relevant to the search query;

generating a plurality of search category selectors based, at least in part, on the search query, each of the plurality of search category selectors being categorically representative, at least in part, of one or more properties of an item and representing a list of one or more additional search terms in a different category of search terms, search terms in each list of one or more additional search terms being distinct from the search category selector representing the list, at least one of the plurality of search category selectors being inactive; and sending instructions to the user computing device to simultaneously display the plurality of search category selectors to the user in the user interface, and upon receipt of a selection of one of the plurality of search category selectors, sending instructions to the user computing device to display, to the user in the user interface, one or more additional search terms represented by the one of the one or more search category selectors with the plurality of search category selectors and with images representing the items in the list of items, wherein at least one of the plurality of search category selectors displayed in the user interface is inactive.

2. The computer-implemented method of claim 1, further comprising modifying the search query by substituting at least one of the plurality of search terms with at least one of the one or more additional search terms in response to a single action received from the user via the user interface of the user computing device, the modified search query to include the at least one of the one or more additional search terms, the single action including receiving and accepting, from the user computing device, an input from the user that selects the at least one of the one or more additional search terms.

3. The computer-implemented method of claim 2, further comprising generating a set of search results by searching, based on the modified search query, for information contained in one or more databases.

4. The computer-implemented method of claim 1, further comprising modifying the search query by removing one of the plurality of search terms from the search query in response to an indication of a single action received from the user computing device, the single action including accepting an input from the user that selects the one of the plurality of search terms to be removed via the user interface.

5. The computer-implemented method of claim 4, wherein the single action includes selecting a delete icon displayed in the search query next to the one of the plurality of search terms.

6. The computer-implemented method of claim 4, further comprising generating a set of search results by searching, based on the modified search query, for information contained in one or more databases.

7. The computer-implemented method of claim 1, further comprising modifying the search query by adding at least one of the one or more additional search terms to the search query in response to one or more additional search terms being received from the user computing device from a single action of a user via the user interface.

8. The computer-implemented method of claim 7, further comprising generating a new set of search results by searching for information contained in one or more databases based on the modified search query.

9. The computer-implemented method of claim 1, further comprising sending instructions to a user computing device to generate a user interface having the plurality of search category selectors and configured to display at least one of the one or more additional search terms in response to an action to be taken by the user within the user interface upon a respective one of the plurality of search category selectors, the user interface to be sent to the user computing device over the communications network.

10. The computer-implemented method of claim 1, wherein at least one of the generated one or more additional search terms represents a property of an item.

11. The computer-implemented method of claim 10, wherein the property includes at least one of a description of the item, a theme associated with the item, a style of the item, a color of the item, a use for the item, a psychological appeal of the item, a specification for the item, a type of intended recipient for the item, and an occasion associated with the item.

12. The computer-implemented method of claim 10, wherein property includes a material that the item is constructed of.

13. The computer-implemented method of claim 10, wherein the property includes a tactile sensation of the item.

14. The computer-implemented method of claim 10, wherein the property includes a construction technique associated with the item.

15. The computer-implemented method of claim 1, further comprising sending instructions to a user computing device to generate a user interface having the one or more additional search terms displayed within a window, the one or more additional search terms received from a selection by a user using an input device operatively coupled to the user interface.

16. The computer-implemented method of claim 15, further comprising modifying the search query by adding a user-selected one of the displayed one or more additional search terms to the search query in response to the user selecting the user-selected additional search term through the user interface.

17. The computer-implemented method of claim 16, further comprising generating a set of search results, based on the modified search query, by searching for information contained in one or more databases.

18. The computer-implemented method of claim 15, further comprising modifying the search query by substituting a user-identified search term in the search query with a user-selected one of the displayed one or more additional search terms in response receiving from the user computing device a user-selected additional search term through the user interface, the modified search query to include the user-selected additional search term.

19. The computer-implemented method of claim 18, further comprising generating a set of search results, based on the modified search query, by searching for information contained in one or more databases.

20. The computer-implemented method of claim 1, wherein the one or more additional search terms are displayed at least partially overlapping one or more of the images representing the items in the list of items.

21. A computer-implemented method, comprising:
receiving, by a search engine, over a communications network, a search query input by a user into a user interface of a user computing device;
identifying a plurality of search terms within the search query, each of the plurality of search terms including at least a portion of the search query;
executing the search query to generate search results including a list of items relevant to the search query;
sending instructions to the user computing device to provide a graphical indication to the user in the user interface, within the search query, graphically identifying one of the plurality of search terms from among the plurality of search terms;
receiving, by the search engine, over the communication network, an indication of a selection, by the user, of a search term from among the plurality of search terms;
sending, over the communications network, one or more alternative search terms from the search engine, the one or more alternative search terms based; at least in part, on the search term; and
sending instructions to the user computing device to display, within the user interface, the search query and the one or more alternative search terms, the instructions causing the one or more alternative search terms to be displayed at least partially overlapping one or more images representing the items in the list of items.

22. The computer-implemented method of claim 21, further comprising sending instructions to the user computing device to enable the user to select one of the one or more alternative search terms displayed within the user interface using a user input device, and modifying the search query by substituting the search term with the selected alternative search term in response to a single action received from the user computing device from the user via the user interface, such that the search query includes the selected alternative search term, the single action including accepting an input from the user that selects the alternative search term to be substituted.

23. The computer-implemented method of claim 21, further comprising receiving from the user computing device a selection from the user of the one or more alternative search terms displayed within the user interface using a user input device, and adding the received selected alternative search term to the search query in response to receiving from the user computing device a single action taken by the user within the user interface, such that the search query includes the selected alternative search term, the single action including accepting an input from the user that selects the alternative search term to be added.

24. The computer-implemented method of claim 21, further comprising receiving from the user computing device a single action to be taken by the user within the user interface to delete the search term from the search query, the single action including accepting an input from the user that selects the search term to be deleted.

25. A computer-implemented method, comprising:
receiving a search query from a user through a user interface of a user computing device by a computer server system over a communications network;
identifying a plurality of search terms within the search query;
generating a set of search results based on the search query, the set of search results including a set of items relevant to the search query;
generating a plurality of search category selectors based, at least in part, on the search query, each of the plurality of search category selectors being categorically representative, at least in part, of one or more properties of an item and representing a list of one or more additional search terms in a different category of search terms, search terms in each list of one or more additional search terms being distinct from the search category selector representing the list; and
sending instructions to the user computing device to simultaneously display the plurality of search category selectors to the user in the user interface, selection of one of the plurality of search category selectors by the user causing the one or more additional search terms represented by the one of the one or more search category selectors to be displayed to the user in the user interface with the plurality of search category selectors and with images separately representing each item in the set of items, the one or more additional search terms being displayed at least partially overlapping one or more of the images representing the items in the list of items.

26. A computer system comprising:
a memory;
a processor coupled to the memory and configured to execute one or more non-transitory programs stored in the memory; and
a network interface coupled to the processor and a communication network, the network interface configured to send and receive data through the communication network;
the one or more programs including instructions executable by the processor and when executed are configured to:
receive, over the communications network; a search query from a user through a user interface of a user computing device;
generate a set of search results based on the search query, the set of search results including a set of items relevant to the search query;
generate a plurality of search category selectors based, at least in part, on the search query, each of the plurality of search category selectors being categorically representative, at least in part, of one or more properties of an item and representing a list of one or more additional search terms in a different category of search terms, search terms in each list of one or more additional search terms being distinct from the search category selector representing the list; and
send instructions to the user computing device to simultaneously display the plurality of search category selectors to the user in the user interface, selection of one of the plurality of search category selectors by the user causing the one or more additional search terms represented by the one of the one or more search category selectors to be displayed to the user in the user interface with the plurality of search category selectors and with images separately representing each item in the set of items, the one or more additional search terms being displayed at least partially overlapping one or more of the images representing the items in the list of items.

27. The system of claim 26, wherein at least one of the plurality of search category selectors displayed in the user interface is inactive.

28. A computer-implemented method of constructing a search query in an electronic commerce environment, the method comprising:
sending, over a communications network, a search query from a user through a user interface of a user computing device, sending of the search query causing a computer system associated with the electronic commerce environment to:
identify a plurality of search terms within the search query, each of the plurality of search terms including at least a portion of the search query;
execute the search query to generate search results including a list of items relevant to the search query; and
generate a plurality of search category selectors based, at least in part, on the search query, each of the plurality of search category selectors being categorically representative, at least in part, of one or more properties of an item and representing a list of one or more additional search terms in a different category of search terms, search terms in each list of one or more additional search terms being distinct from the search category selector representing the list; and
simultaneously displaying the plurality of search category selectors to the user in the user interface, at least one of the plurality of search category selectors displayed in the user interface being inactive, selection of one of the plurality of search category selectors by the user causing the one or more additional search terms represented by the one of the one or more search category selectors to be displayed to the user in the user interface with the plurality of search category selectors and with images representing the items in the list of items.

29. A computer-implemented method of constructing a search query in an electronic commerce environment, the method comprising:
sending; over a communications network, a search query from a user through a user interface of a user computing device, sending of the search query causing a computer system associated with the electronic commerce environment to:
identify a plurality of search terms within the search query, each of the plurality of search terms including at least a portion of the search query;
execute the search query to generate search results including a list of items relevant to the search query; and
generate a plurality of search category selectors based, at least in part, on the search query, each of the plurality of search category selectors being categorically representative, at least in part, of one or more properties of an item and representing a list of one or more additional search terms in a different category of search terms, search terms in each list of one or more additional search terms being distinct from the search category selector representing the list; and
simultaneously displaying the plurality of search category selectors to the user in the user interface, selection of one of the plurality of search category selectors by the user causing the one or more additional search terms represented by the one of the one or more search category selectors to be displayed to the user in the user interface with the plurality of search category selectors and with images representing the items in the list of items, the one or more additional search terms being displayed at least partially overlapping one or more of the images representing the items in the list of items.

30. A computer-implemented method of constructing a search query in an electronic commerce environment, the method comprising:

sending, over a communications network, a search query from a user through a user interface of a user computing device, sending of the search query causing a computer system associated with the electronic commerce environment to:
identify a plurality of search terms within the search query, each of the plurality of search terms including at least a portion of the search query; and
execute the search query to generate search results including a list of items relevant to the search query;
providing a graphical indication to the user in the user interface, within the search query, graphically identifying one of the plurality of search terms from among the plurality of search terms;
sending, over the communication network, an indication of a selection, by the user, of a search term from among the plurality of search terms, sending of the indication causing the computer system associated with the electronic commerce environment to generate, based at least in part on the search term, one or more alternative search terms that are each different from the search term;
receiving, over the communication network, the one or more alternative search terms at the user computing device; and
simultaneously displaying the search query and the one or more alternative search terms with images representing the items in the list of items, the one or more alternative search terms being displayed at least partially overlapping one or more of the images representing the items in the list of items.

* * * * *

UNITED STATES PATENT AND TRADEMARK OFFICE
CERTIFICATE OF CORRECTION

PATENT NO. : 10,650,053 B2
APPLICATION NO. : 15/461920
DATED : May 12, 2020
INVENTOR(S) : Kalin et al.

Page 1 of 1

It is certified that error appears in the above-identified patent and that said Letters Patent is hereby corrected as shown below:

In the Claims

Claim 12: In Column 15, Line 59, after "wherein" insert -- the --.

Claim 21: In Column 16, Line 51, delete "based;" and insert -- based, --, therefor.

Claim 26: In Column 17, Line 65, delete "network;" and insert -- network, --, therefor.

Claim 29: In Column 18, Line 66, delete "sending;" and insert -- sending, --, therefor.

Signed and Sealed this
Twenty-first Day of July, 2020

Andrei Iancu
*Director of the United States Patent and Trademark Office*